US010184591B2

(12) United States Patent
Sakmar et al.

(10) Patent No.: US 10,184,591 B2
(45) Date of Patent: *Jan. 22, 2019

(54) CABLE SUSPENSION CLAMP

(71) Applicant: Hubbell Incorporated, Shelton, CT (US)

(72) Inventors: John E. Sakmar, Birmingham, AL (US); Joshua C. Wilson, Birmingham, AL (US); Jacob A. Nelson, Irondale, AL (US)

(73) Assignee: Hubbell Incorporated, Shelton, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/589,433

(22) Filed: May 8, 2017

(65) Prior Publication Data

US 2017/0241570 A1 Aug. 24, 2017

Related U.S. Application Data

(63) Continuation of application No. 14/771,689, filed as application No. PCT/US2014/019111 on Feb. 27, 2014, now Pat. No. 9,664,308.

(60) Provisional application No. 61/771,366, filed on Mar. 1, 2013.

(51) Int. Cl.
| F16L 3/00 | (2006.01) |
| F16L 3/10 | (2006.01) |
| G02B 6/44 | (2006.01) |
| G02B 6/48 | (2006.01) |
| F16L 3/11 | (2006.01) |

(52) U.S. Cl.
CPC .......... *F16L 3/1041* (2013.01); *F16L 3/1083* (2013.01); *F16L 3/11* (2013.01); *G02B 6/4471* (2013.01); *G02B 6/4478* (2013.01); *G02B 6/483* (2013.01)

(58) Field of Classification Search
None
See application file for complete search history.

(56) References Cited

U.S. PATENT DOCUMENTS

| 1,928,622 | A | * | 10/1933 | Hendee | H02G 7/053 |
| | | | | | 174/40 R |
| 2,026,260 | A | * | 12/1935 | Tarbox | E01F 15/06 |
| | | | | | 24/135 L |
| 2,699,462 | A | | 1/1955 | Exner | |
| 2,984,441 | A | * | 5/1961 | Dalmasso | H02G 7/14 |
| | | | | | 174/42 |
| 3,165,763 | A | * | 1/1965 | Gaylord | B63C 9/23 |
| | | | | | 244/147 |
| 3,185,763 | A | * | 5/1965 | Harmon | H01B 17/42 |
| | | | | | 174/144 |
| 3,219,298 | A | | 11/1965 | Ruhlman | |
| 3,274,654 | A | * | 9/1966 | Becker | H02G 7/056 |
| | | | | | 24/132 R |

(Continued)

*Primary Examiner* — Monica E Millner
(74) *Attorney, Agent, or Firm* — Michael Best & Friedrich, LLP

(57) ABSTRACT

A cable clamp includes an elongated, open-top base having a first end, a second end, and a central region. A suspension arm extends from the open-top base. An eyelet having an opening, a top portion, and a base portion is coupled to the suspension arm. The eyelet base portion has a first width and the top portion has a second width greater than the first width. A keeper is coupled to the base.

19 Claims, 18 Drawing Sheets

(56) References Cited

U.S. PATENT DOCUMENTS

| | | | | |
|---|---|---|---|---|
| 3,288,409 | A * | 11/1966 | Bethea, Jr. | F16G 11/06 174/40 R |
| 3,358,953 | A | 12/1967 | Bethea, Jr. | |
| 3,547,389 | A | 12/1970 | Burgess et al. | |
| 3,561,708 | A * | 2/1971 | Dubey | H02G 7/08 174/41 |
| 3,622,858 | A | 11/1971 | Mitchell | |
| 3,623,687 | A | 11/1971 | Nordstrom | |
| 3,633,858 | A * | 1/1972 | Houston | H02G 7/053 174/42 |
| 3,706,436 | A * | 12/1972 | Lindsey | F16L 3/16 174/169 |
| 4,258,228 | A * | 3/1981 | Jean | H01B 17/22 174/168 |
| 4,383,668 | A * | 5/1983 | Hall | F16G 11/06 174/42 |
| 4,393,998 | A * | 7/1983 | Allen | F16L 3/18 156/306.9 |
| 4,501,400 | A * | 2/1985 | Leonardo | F16L 3/08 248/316.1 |
| 4,538,782 | A * | 9/1985 | Kirschenbaum | H02G 3/32 174/171 |
| 4,727,224 | A | 2/1988 | Kellett et al. | |
| 4,832,442 | A * | 5/1989 | Pappas | G02B 6/483 174/40 R |
| 5,195,704 | A * | 3/1993 | Louie | F16L 3/105 248/316.6 |
| 5,261,633 | A * | 11/1993 | Mastro | F16L 3/18 248/68.1 |
| 5,435,507 | A * | 7/1995 | Murphy | F16L 3/10 174/40 R |
| 5,711,639 | A * | 1/1998 | Tessier | E21B 17/012 24/285 |
| 5,893,538 | A * | 4/1999 | Onishi | H02G 3/263 248/222.52 |
| 6,135,398 | A * | 10/2000 | Quesnel | H02G 7/053 248/74.1 |
| 6,892,990 | B2 * | 5/2005 | Pisczak | H02G 7/053 248/62 |
| 7,432,449 | B2 | 10/2008 | Kim | |
| 7,485,132 | B1 | 2/2009 | McBride | |
| 7,770,848 | B2 * | 8/2010 | Johnson | F16L 3/1207 248/65 |
| 7,946,547 | B2 | 5/2011 | Bernstorf et al. | |
| 8,439,317 | B2 * | 5/2013 | Sampson | F16L 3/1083 248/63 |
| 8,500,073 | B2 * | 8/2013 | Quesnel | H02G 7/053 24/285 |
| 8,870,132 | B2 * | 10/2014 | Sampson | F16L 3/123 248/62 |
| 9,222,602 | B2 * | 12/2015 | Dworak, Jr. | F16L 3/1075 |
| 2003/0122040 | A1 * | 7/2003 | Pisczak | H02G 7/053 248/74.1 |
| 2003/0183733 | A1 | 10/2003 | Pisczak | |
| 2004/0178617 | A1 * | 9/2004 | Lagsdin | E02F 9/085 280/763.1 |
| 2007/0028958 | A1 | 2/2007 | Retti | |
| 2007/0034767 | A1 * | 2/2007 | Mastropaolo | A47B 23/02 248/447.2 |
| 2008/0230657 | A1 * | 9/2008 | Booth | F16L 3/1008 248/63 |
| 2009/0014208 | A1 | 1/2009 | Quesnel | |
| 2012/0037765 | A1 * | 2/2012 | Guthke | F16L 3/1041 248/67.5 |
| 2012/0214328 | A1 * | 8/2012 | Downing | F16L 3/00 439/345 |
| 2014/0231598 | A1 * | 8/2014 | Miller | H02G 7/053 248/63 |
| 2016/0003376 | A1 * | 1/2016 | Sakmar | G02B 6/4471 248/63 |

* cited by examiner

CABLE SUSPENSION CLAMP

RELATED APPLICATIONS

This application is a continuation of U.S. application Ser. No. 14/771,686, filed Aug. 31, 2015, which is a national stage application of international application PCT/2014/019111, filed Feb. 27, 2014, which claims priority to U.S. provisional application Ser. No. 61/771,366, the disclosures of which are incorporated herein by reference in their entirety and to which priority is claimed.

FIELD OF THE INVENTION

The present invention relates generally to a cable clamping mechanism. The cable clamping mechanism may be used, for example, with fiber optic cables such as ribbon fiber optic cables.

BACKGROUND

Modern telecommunication utilizes a number materials and mediums to transmit information. Recently, cables, such as fiber optic cables have become more popular in the communication industry and have begun to replace electrical wires. Fiber optic cables include transparent optical fibers made of glass or plastic and are capable of transmitting voice, video, and data. Compared to electrical wires, fiber optic cables permit signals to travel longer distances with less loss and less electromagnetic interference.

Fiber optic cables may be used in various applications, including residential and commercial use. In order to travel long distances, fiber optic cables may be suspended aerially along existing utility poles. Traditional clamps for hanging metal wires from utility poles, however, are not suitable for use with fiber optic cables.

Fiber optic cables can be flexible, but excessive bending may cause damage and data loss. Fiber optic cables also come in a variety of sheathings and designs resulting in different bend characteristics and load strengths. These are considerations not typically given to metal wires, due to the different strength and flexibility characteristics. Because of these differences, traditional wire cable clamps usually do not meet the needs for reliable suspension of fiber optic cables, have too many parts, and are difficult to use and install. Typical clamps are also over-engineered for fiber optic applications in terms of clamping force and body strength due to the lower weight and tension requirements for fiber optic cables compared to wire electrical conductors.

SUMMARY

In accordance with an embodiment, a cable clamp includes a base, a suspension arm, an eyelet, and a keeper. The base is an elongated, open-top base having a first end, a second end, and a central region. The suspension arm extends from the open-top base. The eyelet has an opening, a top portion, and a base portion and is coupled to the suspension arm. The eyelet base portion has a first width and the top portion has a second width greater than the first width. The keeper is coupled to the base.

In accordance with a further embodiment, a cable clamp includes a base, an eyelet, and a keeper. The base is an elongated, open-top base having a first end, a second end, a central region, a suspension arm, a first recess, and a second recess. The eyelet has a base and a top portion connected to the suspension arm. The eyelet base portion has a first width and the top portion has a second width greater than the first width. The keeper is coupled to the open-top base. The keeper has a semi-obround clamping arm including an arcuate first leg, an arcuate second leg, and a substantially planar central portion extending between the first leg and the second leg. The first leg is received in the first recess and the second leg is received in the second recess.

An exemplary object of the invention is to provide a clamp suitable for use with a variety of cables, such as fiber optic cables having different bend characteristics.

Another exemplary object of the invention is to provide a clamp suitable for securely retaining a cable while minimizing potential damage to the cable and data transmission loss.

Another exemplary object of the invention is to provide a suitable clamp which reduces the amount of materials used to increase manufacturing efficiency and reduce costs.

Another exemplary object of the invention is to provide a suitable clamp which reduces the number of parts to minimize failure during use.

Other objects and embodiments, including apparatus, systems, methods, and the like which constitute part of the invention, will become more apparent upon reading the following detailed description of the exemplary embodiments and viewing the drawings. It is to be understood that both the foregoing general description and the following detailed description are exemplary and explanatory only and therefore not restrictive.

BRIEF DESCRIPTION OF THE DRAWINGS

The accompanying drawings are incorporated in and constitute a part of the specification. The drawings, together with the general description given above and the detailed description of the exemplary embodiments and methods given below, serve to explain the principles of the invention.

DETAILED DESCRIPTION OF EXEMPLARY EMBODIMENT(S) AND EXEMPLARY METHOD(S)

Figure 1:
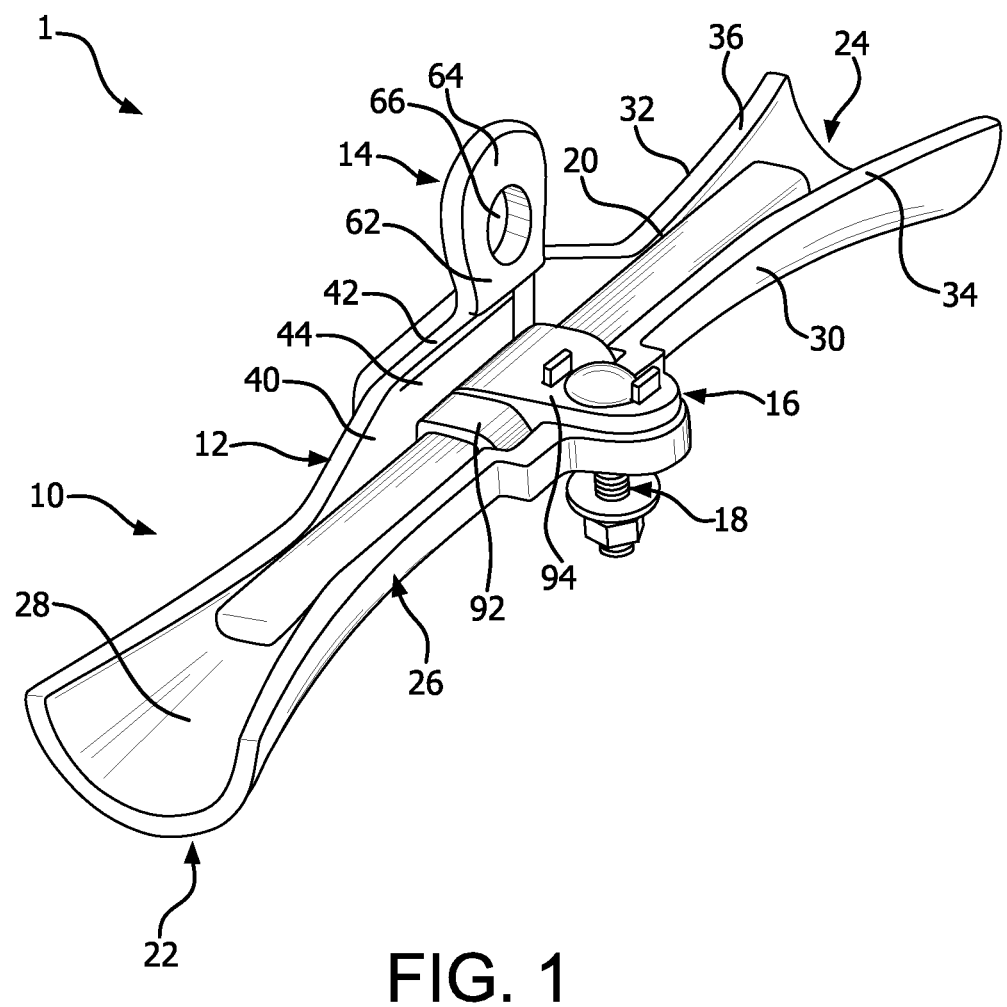
FIG. 1 is a perspective view of an exemplary cable clamp and ribbon cable.

Reference will now be made in detail to exemplary embodiments and methods of the invention as illustrated in the accompanying drawings, in which like reference characters designate like or corresponding parts throughout the drawings. It should be noted, however, that the invention in its broader aspects is not limited to the specific details, representative devices and methods, and illustrative examples shown and described in connection with the exemplary embodiments and methods.

Figure 4:
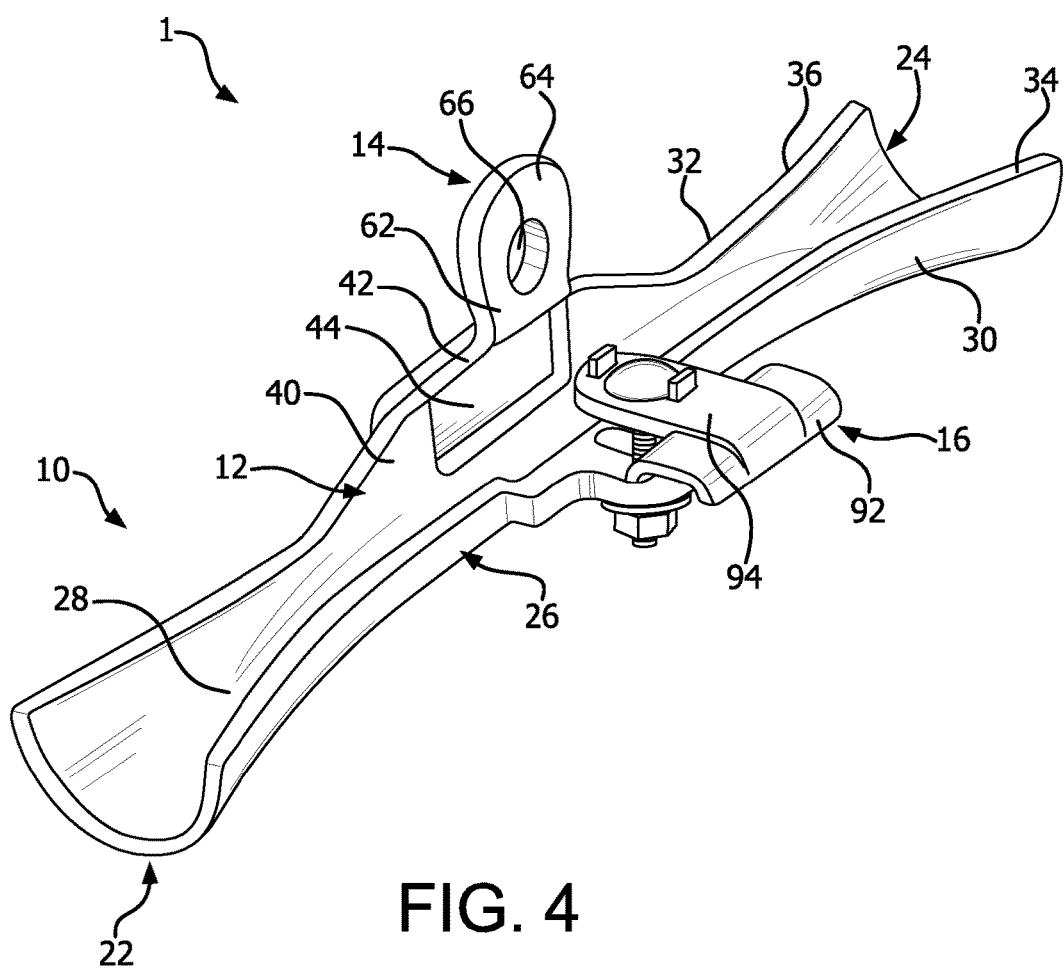
FIG. 4 is a perspective view of the cable clamp of FIG. 2 with a keeper outwardly rotated.

In various exemplary embodiments, a cable suspension clamp 1 includes a base 10, a suspension arm 12 extending from the base 10, an eyelet 14 coupled to the suspension arm 12, and a keeper 16 detachably coupled to the base 10. The keeper 16 may be rotatably coupled to the base 10, for example via a mechanical fastener, such as a bolt 18, as shown in FIG. 4. The base 10, suspension arm 12, and eyelet 14 may be formed as a unitary structure and may be a metallic, composite, or other suitable material.

Figure 5:
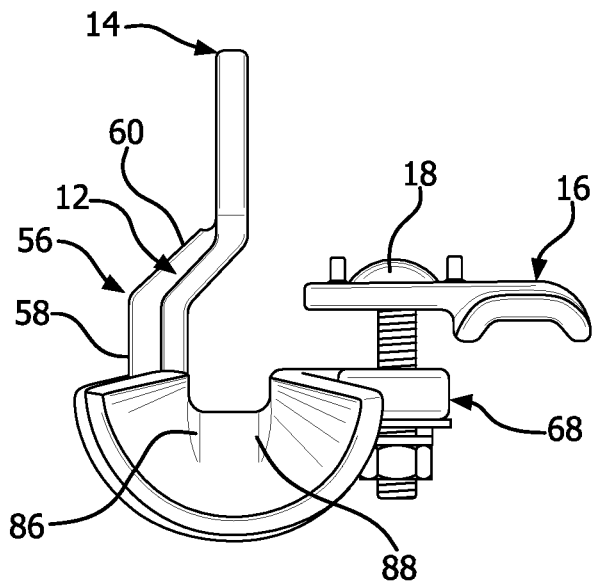
FIG. 5 is a left side elevational view of the cable clamp of FIG. 4.
Figure 6:
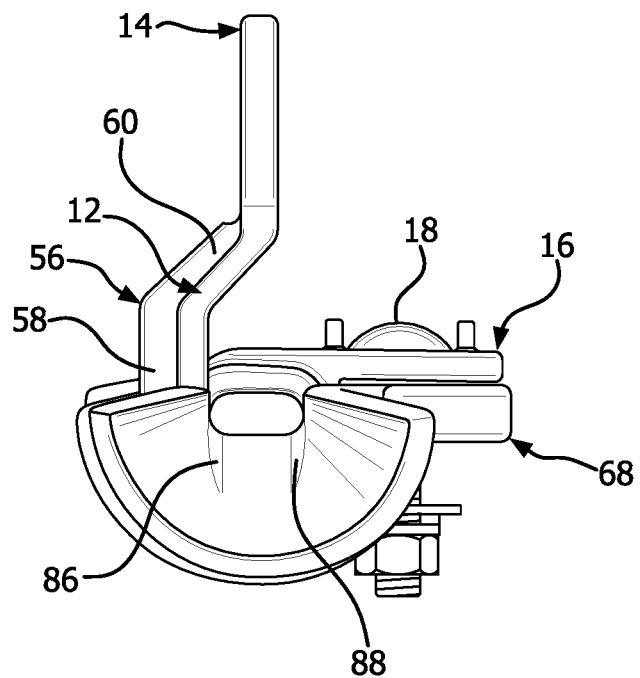
FIG. 6 is a left side elevational view of the cable clamp of FIG. 2.
Figure 7:
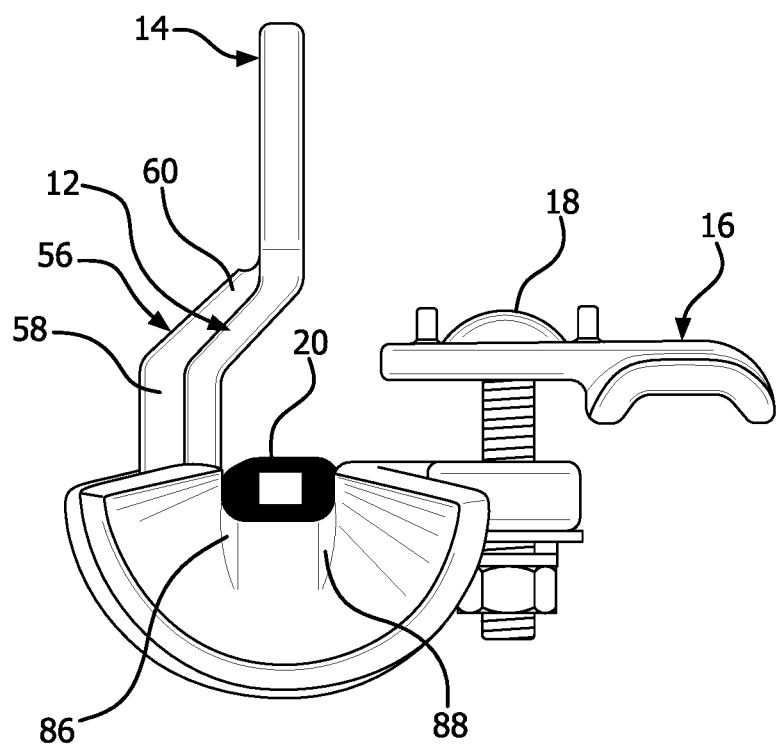
FIG. 7 is a left side elevational view of the cable clamp of FIG. 1 with the keeper outwardly rotated and the cable inserted.

The base 10 may be suspended from a structure, such as a utility pole, by coupling one end of a mechanical fastener, such as a hook or a bolt-hook 11 with the eyelet 14 and inserting or connecting the other end of the mechanical fastener into the structure. As best shown in FIGS. 4 and 5, the keeper 16 may be rotated outwardly to facilitate easy installation of a cable 20. After the cable 20 is placed in the base 10, the keeper 16 may be rotated inwardly and secured in position over the cable 20 as shown in FIG. 1.

The base 10 includes a first end 22, a second end 24 and a central region 26. The first end 22, second end 24, and central region 26 combine to have an open-top, elongated and semi-obround structure with a central channel or cavity 28 with substantially semi-circular cross-sections in different locations along its length as seen in the drawings. The base 10 also includes a first sidewall 30 and a second sidewall 32 extending from the central channel 28. The first sidewall 30 terminates in a first top edge 34 and the second sidewall 32 terminates in a second top edge 36. In various alternative embodiments, the base 10 may include various shapes, angles, and structures. In various exemplary embodiments, different bases other than the one depicted in the drawings may be utilized with other features of the invention described herein, for example the suspension arm 12, eyelet 14 and keeper 16.

Figure 13:
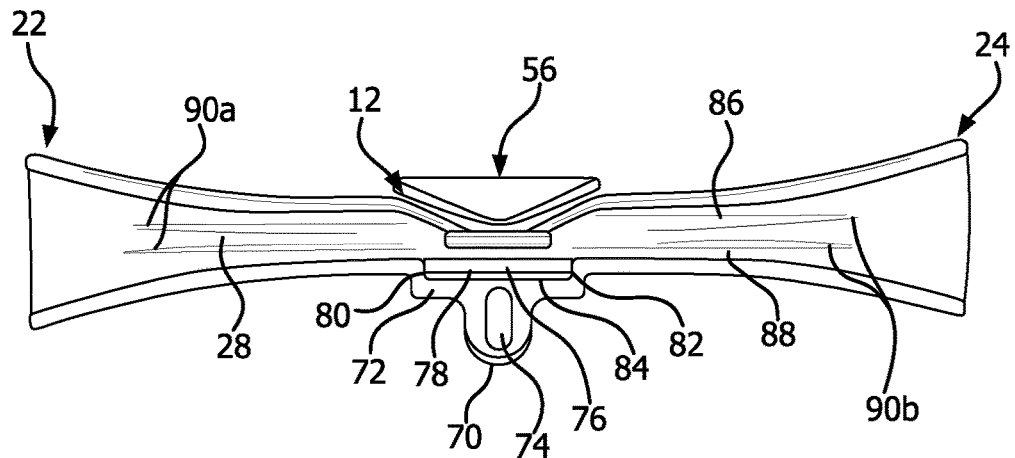
FIG. 13 is a top plan view of the cable clamp of FIG. 10.
Figure 14:
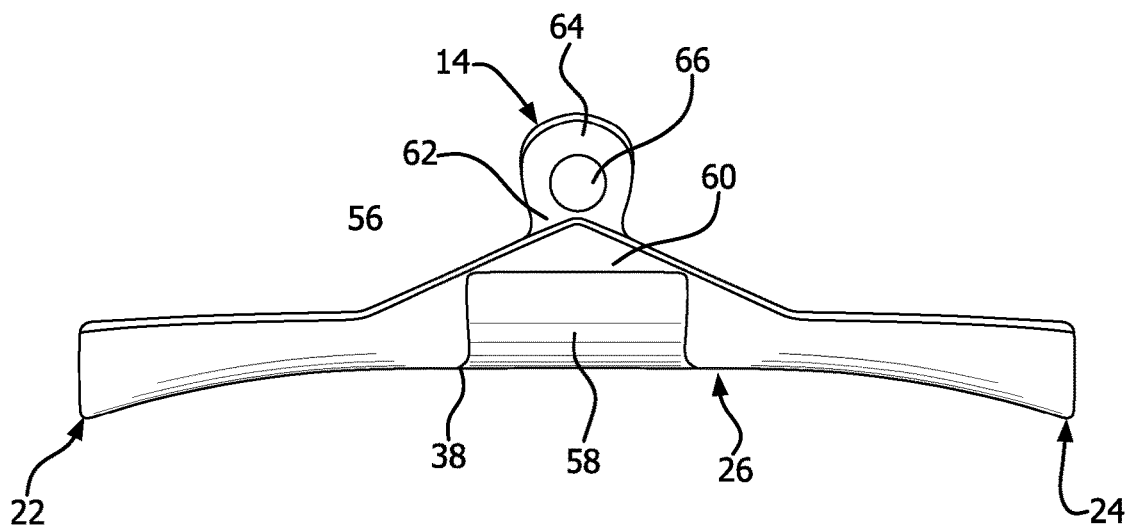
FIG. 14 is a rear elevational view of the cable clamp of FIG. 10.

The first and second ends 22, 24 may be outwardly flared compared to the central region 26, meaning that the first and second sidewalls 30, 32 are outwardly curved and angled in the first and second ends 22, 24 and the central channel 28 slops downwardly and outwardly. Specifically, as best shown in FIG. 13, the first and second sidewalls 30, 32, and thus the first and second top edges 34, 36 in the central region 26 are substantially planar, but begin to angle away from the central region 26 so that the first and second sidewalls 30, 32 diverge in the first and second ends 22, 24. As best shown in FIG. 14, the central channel 28 has a substantially planar bottom surface 38 in the central region 26. At the first and second ends 22, 24 the central channel begins to curve downwardly from the central region 26. The first and second ends 22, 24 therefore expand outwardly as the base 10 transitions from the central region 26 to the terminus of the first and second ends 22, 24. This gives the first and second ends 22, 24 an outwardly flared structure.

The amount of divergence of the first and second sidewalls 30, 32 may be linear or it may increase from the central region 26 to the terminus of the first and second ends 22, 24. Similarly, the radius of curvature of the central channel 28 may be constant, as measured from a selected point, or it may vary from the central region 26 to the terminus of the first and second ends 22, 24. The first and second ends 22, 24 may therefore contain different radii as may be beneficial for use with certain cables, for example, fiber optic cables made by CORNING®, such as the RPX® line of ribbon cables. Similar cables are disclosed in U.S. Pat. No. 6,618,526 and PCT Publication WO 2013/025915, the disclosures of which are hereby incorporated by reference to show various types of fiber optic cables and their structure and are not meant to limit the interpretation of the present embodiments.

The suspension arm 12 extends from the base 10, for example, from the second sidewall 32. The suspension arm 12 includes a first wall 40 and a second wall 42. The first wall 40 may extend substantially vertically with respect to the second sidewall 32. The second wall 42 may be angled relative to the first wall so that the suspension arm 12 extends out over the central channel 28. As best shown in FIGS. 13 and 14, the second top edge 36 may angle upwardly in the region of the suspension arm 12, giving the suspension arm 12 a generally triangular or trapezoidal shape. In various exemplary embodiments, the suspension arm may extend along the length of the central region 26.

Figure 15:
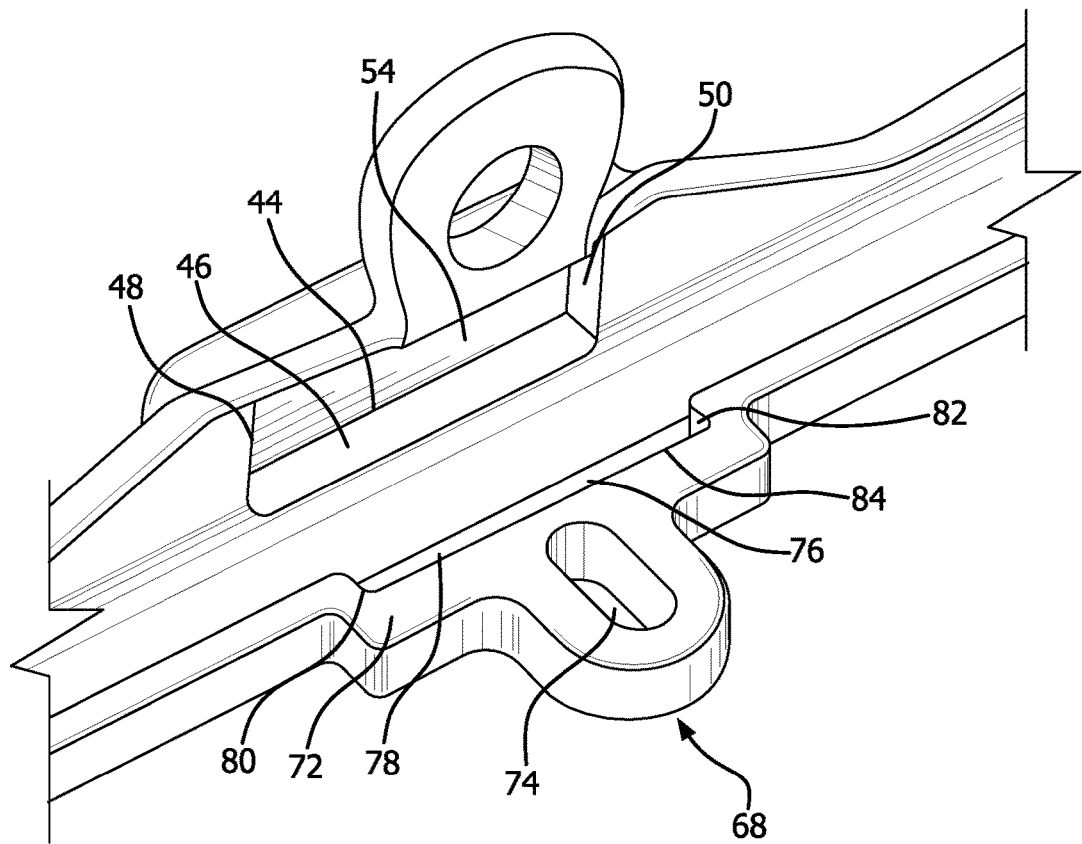
FIG. 15 is an enlarged fragmentary perspective view of a central region of the cable clamp of FIG. 10.
Figure 16:
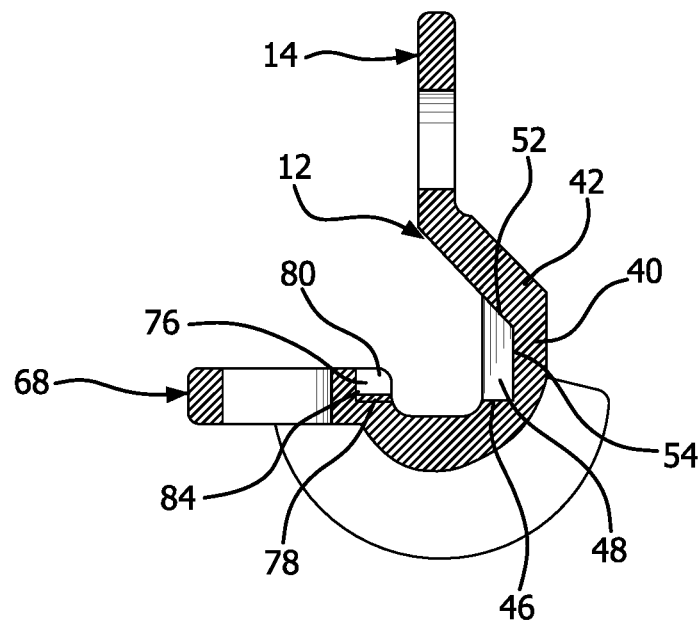
FIG. 16 is a right side elevational view in section taken along line 16-16 of the cable clamp of FIG. 10.
Figure 17:
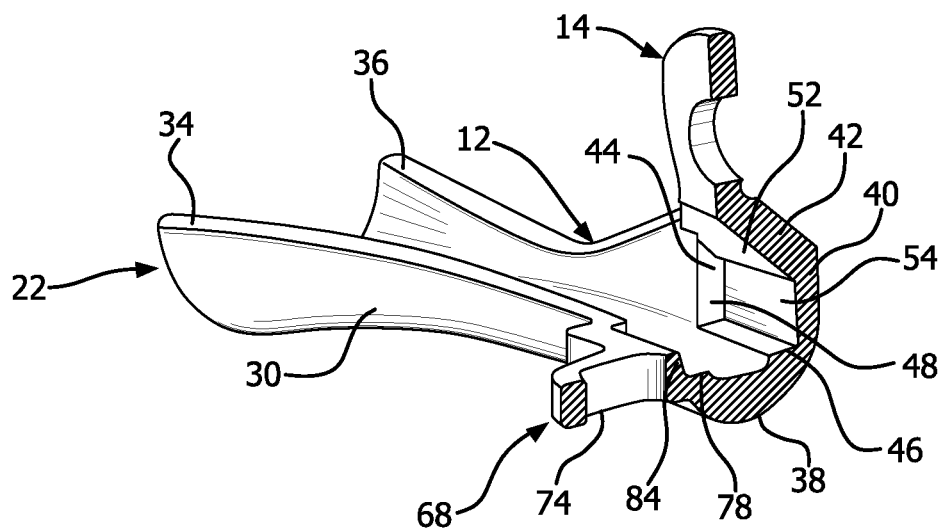
FIG. 17 is a perspective view in section taken along line 16-16 of the cable clamp of FIG. 10.
Figure 18:
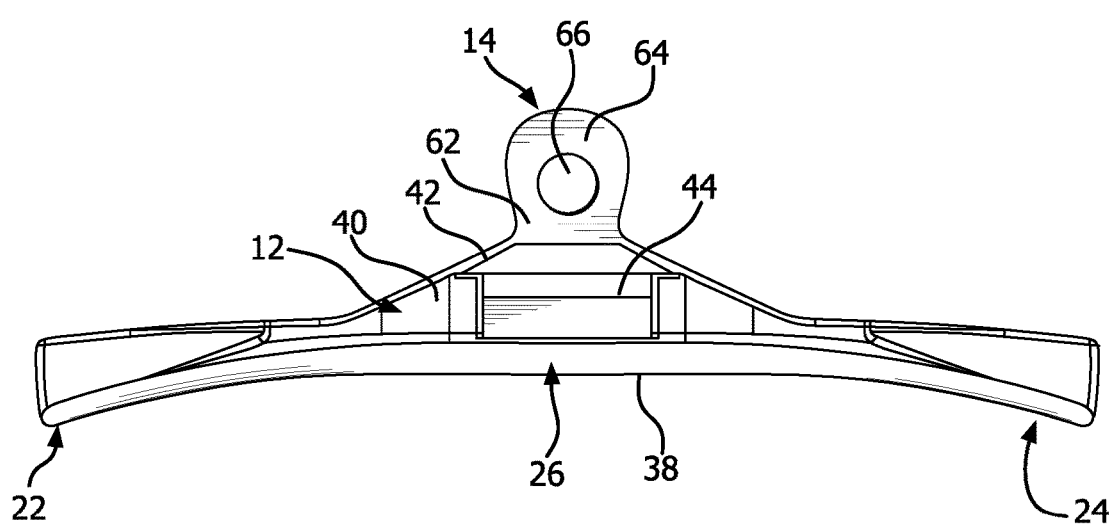
FIG. 18 is a front elevational view in longitudinal section taken along line 18-18 of the cable clamp of FIG. 10.

The base 10 may include a first recess 44 for receiving the keeper 16. As best shown in FIG. 15, the first cavity 44 may extend into the suspension arm 12. The first cavity 44 has a bottom surface 46, a first side surface 48, a second side surface, 50, a top surface 52, and a back surface 54. As best shown in FIGS. 16 and 17, the top surface 52 may be angled in correlation with the angled second wall 42 of the suspension arm.

The suspension arm 12 may also include a reinforcement 56 as best shown in FIGS. 13 and 14. The reinforcement 56 extends outwardly from the suspension arm 12. The reinforcement 56 may be formed due to the creation of the first recess 44 so that a uniform thickness is achieved in the entire suspension arm 12. The reinforcement 56 may also provide additional material to increase the strength of the base 10 in areas where loading and stress can be higher. The suspension arm 12 having a uniform thickness and increased material need not be mutually exclusive, so that different combinations may be used at different points to increase strength or reduce material as needed.

The reinforcement 56 may have an obelisk shape with a substantially square bottom 58 and a triangular top 60. The intersections and corners of the bottom 58 and the top 60 may be rounded, chamfered or otherwise blended into each other, and the sides and edges of the reinforcement 56 may similarly be rounded, chamfered, or otherwise blended into the rest of the suspension arm 12. Any size, shape, and/or design of reinforcement 56 may be used as needed or required for a particular application.

Figure 8:
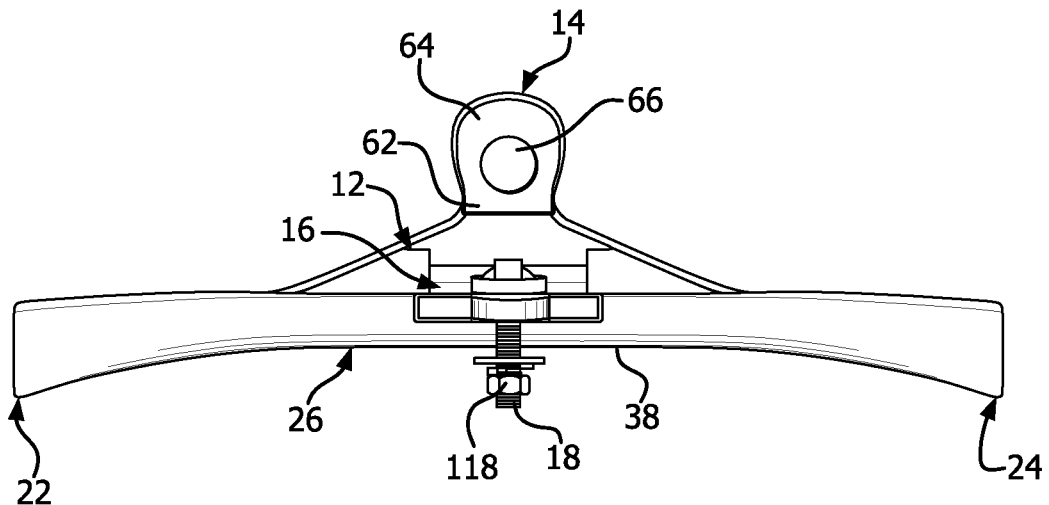
FIG. 8 is a front elevational view of the cable clamp of FIG. 2.
Figure 9:
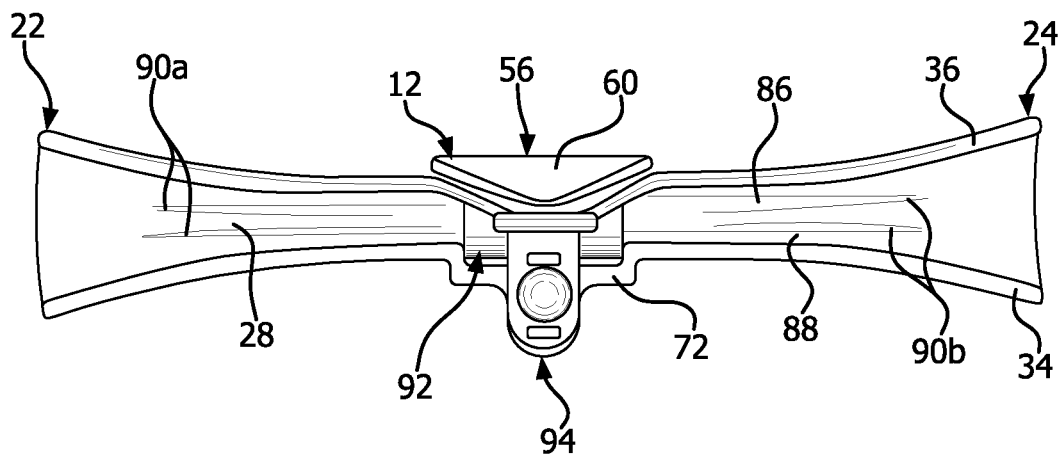
FIG. 9 is a top plan view of the cable clamp of FIG. 2.
Figure 10:
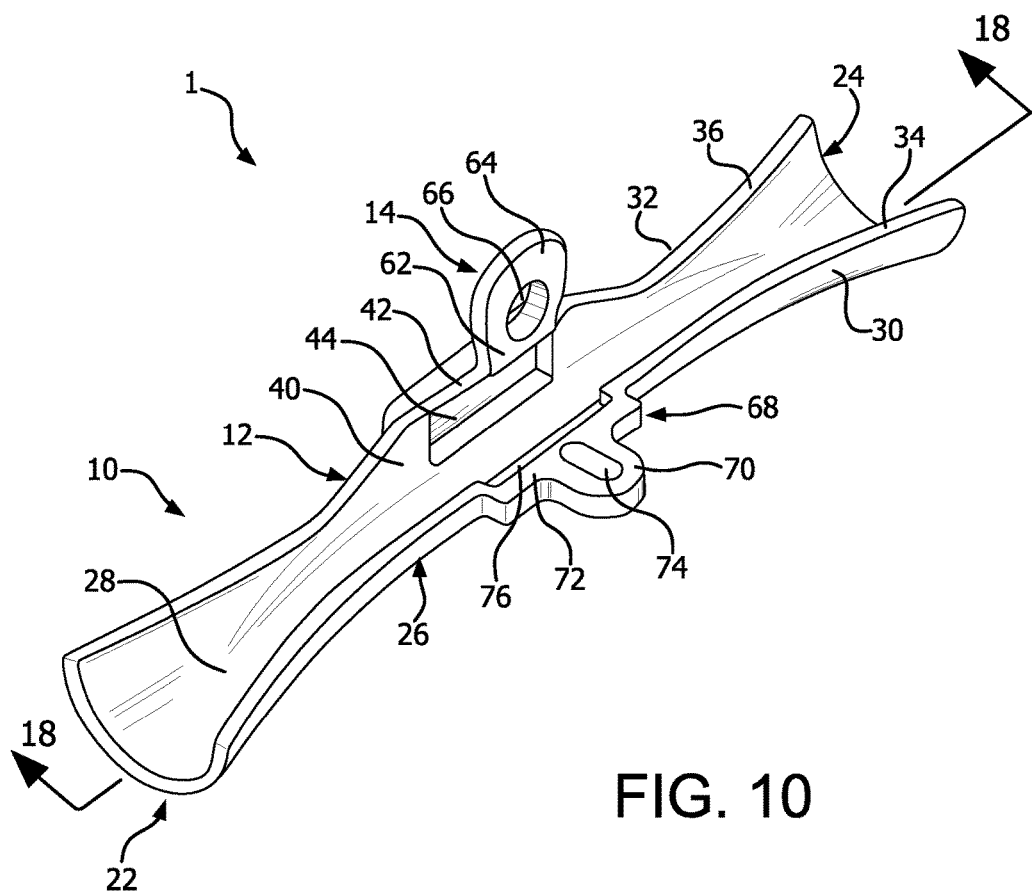
FIG. 10 is a perspective view of the cable clamp of FIG. 2 without the keeper attached.
Figure 11:
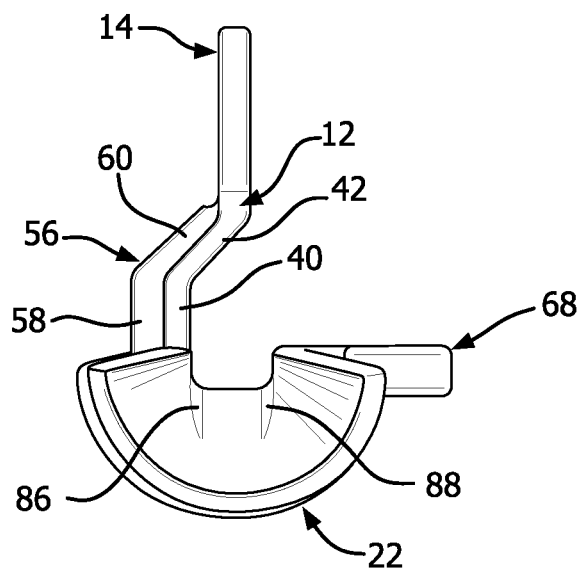
FIG. 11 is a left side elevational view of the cable clamp of FIG. 10.
Figure 12:
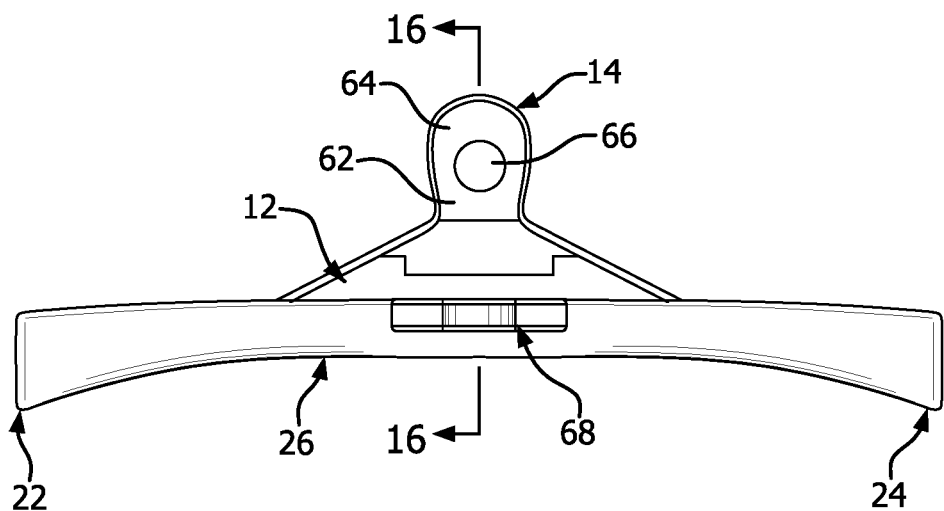
FIG. 12 is a front elevational view of the cable clamp of FIG. 10.

The eyelet 14 is connected to or extends from the top 60 of the suspension arm 12. As best shown in FIGS. 8, 12, and 14, the eyelet has a narrow base portion 62 and a wider top portion 64 with an opening 66. The eyelet 14 may include rounded outer edges with a width that transitions from the wider top portion 64 to the narrow base portion 62 to give the eyelet 14 a spatulate shape. The bottom portion 62, top portion 64, and opening 66 may have any number of shapes and/or sizes to facilitate connections to various mechanical fasteners, suspension devices, or structures.

In various exemplary embodiments, the narrow base portion 62 allows for easier attachment through the opening 66 to a mechanical fastener, such as bolt-hook 11. When connected to a bolt-hook 11, or other mechanical fasteners, the base 10 may pivot and/or move on the hook portion to reduce stress and loading on the cable 20. The wider top portion 64, however, helps prevent the eyelet 14 from leaving the hook and traveling along the base of the bolt-hook 11. It is advantageous to prevent the eyelet 14 from leaving the hook portion, as it may cause damage to the base 10 and the cable 20, as well as create data loss for information transmitted along the cable 20.

A tab 68 extends from the first sidewall 30 as best shown in FIGS. 13 and 15. The tab 68 has a rounded outer edge 70 which is connected to a rectangular foot 72. A slot 74 is formed in the tab 68 for receiving a mechanical fastener, such as the bolt 18, releasably for connecting the keeper 16 to the base 10. The slot 74 may be sized to receive a variety of bolt 18 sizes and to allow for adjustment and movement of the bolt 18 in the slot 74. [0052] The foot 72 is adjacent a second recess 76. The second recess 76 has a bottom surface 78, a first side surface 80, a second side surface 82, and a back surface 84. The second recess 76 back surface 84 faces the first recess 44 back surface 54. As best shown in FIGS. 16 and 17, the second recess 76 bottom surface 78 is raised form the central channel 28 and substantially planar with the first recess 44 bottom surface 46.

As best shown in FIGS. 5-7 and 13, the base 10 may include a first groove 86 and a second groove 88. The first and second grooves 86, 88 may assist in seating and retaining the cable 20. The first and second grooves 86, 88 may run longitudinally along the length of the central region and into the first and second ends 22, 24, though their lengths may vary. The first and second grooves 86, 88 may have tapered points 90a, 90b at each end and widen towards the center of each groove 86, 88. In certain embodiments, the first groove 86 and the second groove 88 may widen to the point where they begin to blend together at their respective centers. Various shapes and sizes of grooves 86, 88 may be used apart from those depicted.

In various exemplary embodiments, the base 10, suspension arm 12, eyelet 14, and tab 68 may be separate components which are coupled to one another, they may be integrally formed as one unitary structure, or they may be any combination thereof.

Figure 19:
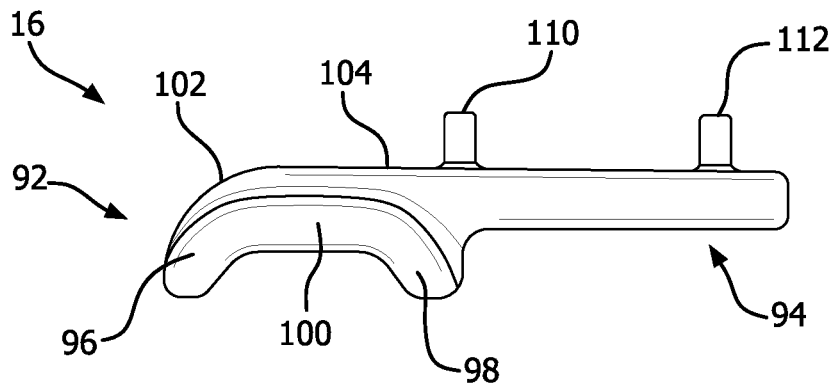
FIG. 19 is a left side elevational view of the keeper shown in FIG. 1.
Figure 20:
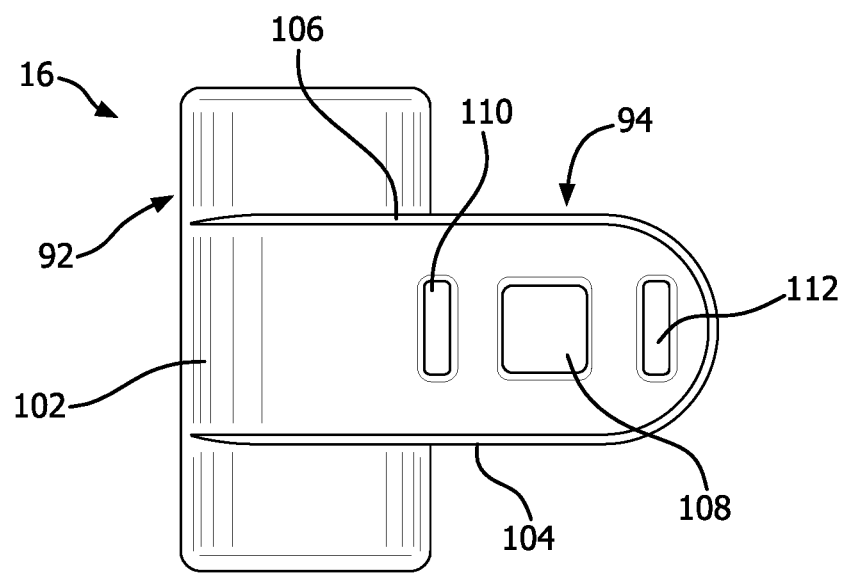
FIG. 20 is a top plan view of the keeper of FIG. 19.

The keeper 16 includes a clamping arm 92 and an attachment arm 94. The clamping arm 92 extends along a portion of the base 10 and thus along a portion of the cable 20. As best shown in FIG. 19, the clamping arm 92 has a substantially obround cross-section having a first leg 96, a second leg 98, and a central portion 100. The first and second legs 96, 98 are substantially arcuate.

Figure 2:
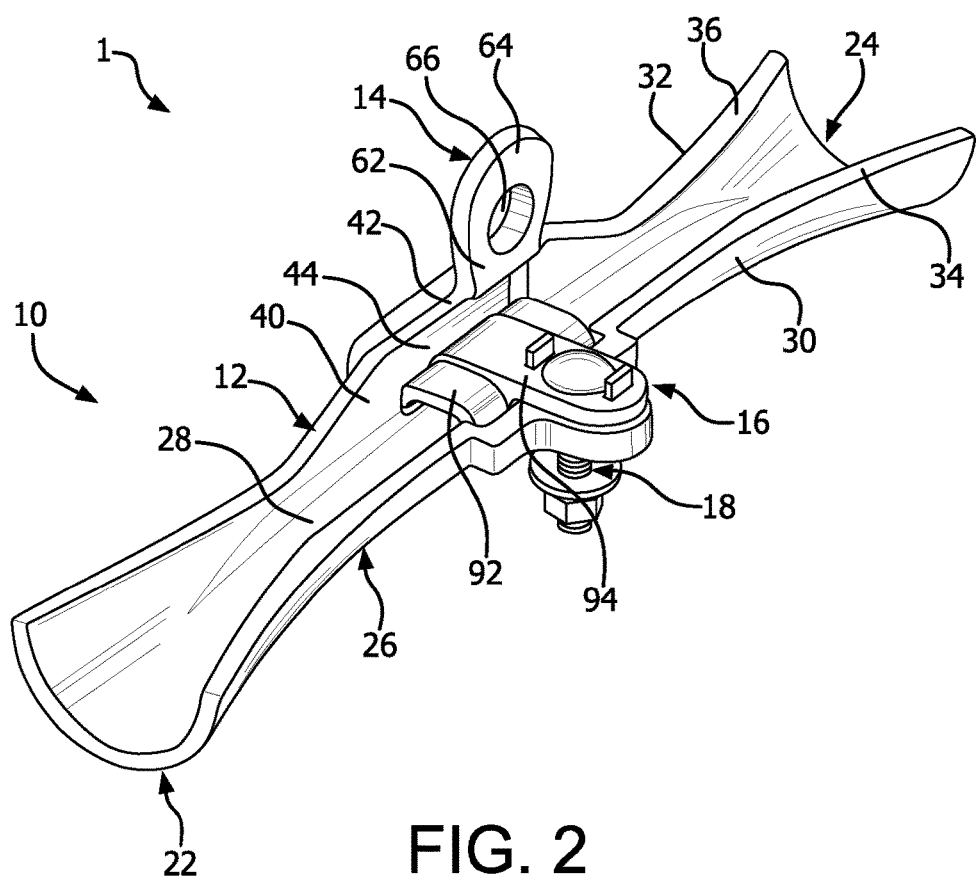
FIG. 2 is a perspective view of the cable clamp of FIG. 1 without the ribbon cable.
Figure 3:
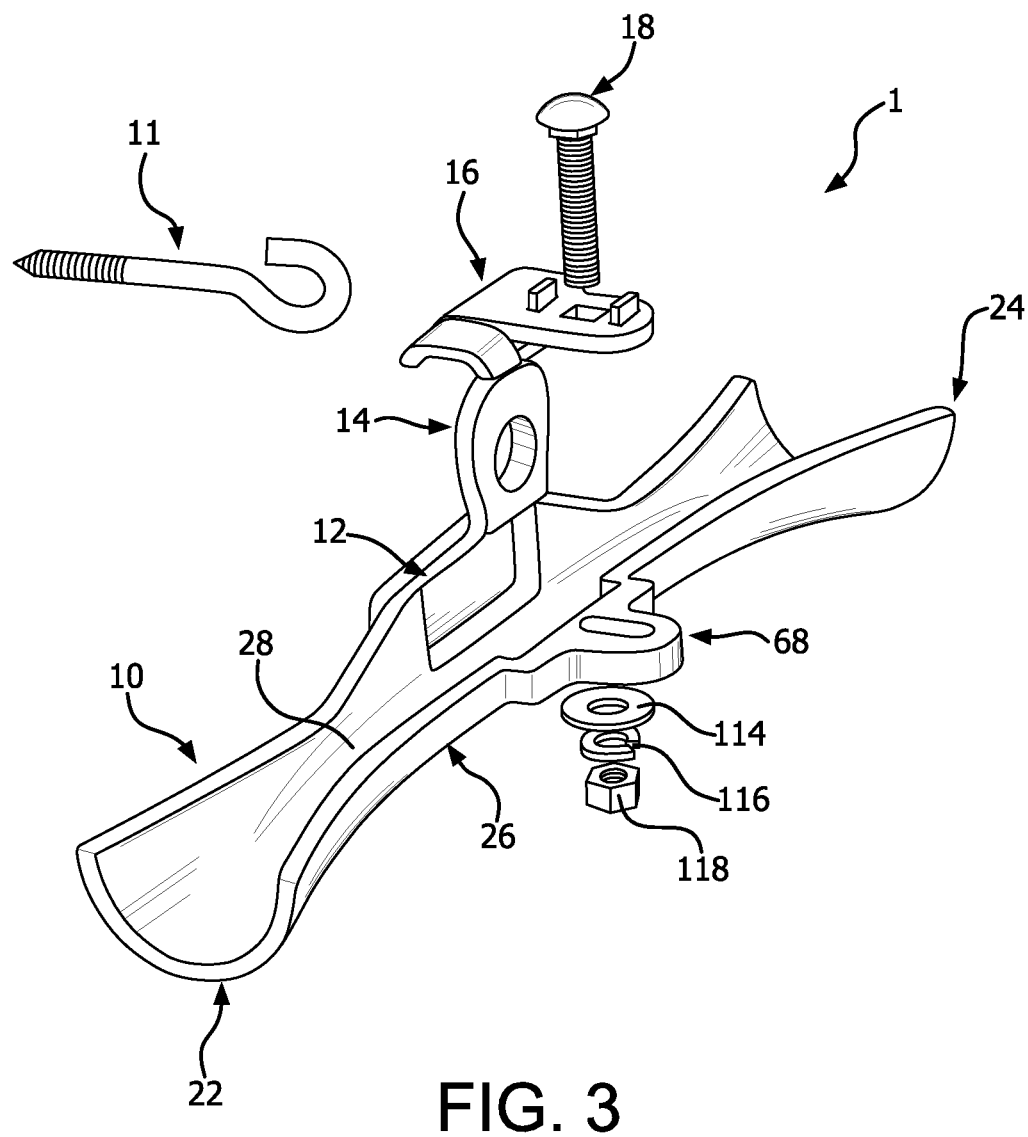
FIG. 3 is a perspective, exploded view of the cable clamp of FIG. 2 including an optional bolt-hook.

As best shown in FIGS. 1 and 2, the first leg 96 is received in the first recess 44 and the second leg 98 is received in the second recess 76. The first and second legs 96, 98 rest on the respective bottom surfaces 46, 78 of the first and second recesses 44, 76. This elevates the keeper 16 from the central channel 28 and prevents the keeper 16 from over-compressing the cable 20 and causing damage.

Figure 21:
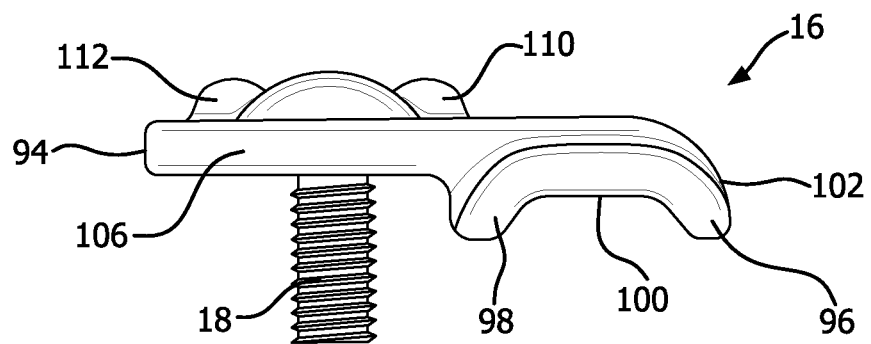
FIG. 21 is a right side elevational view of the keeper of FIG. 20 with a bolt received in the keeper with protrusions peened to retain the bolt.
Figure 22:
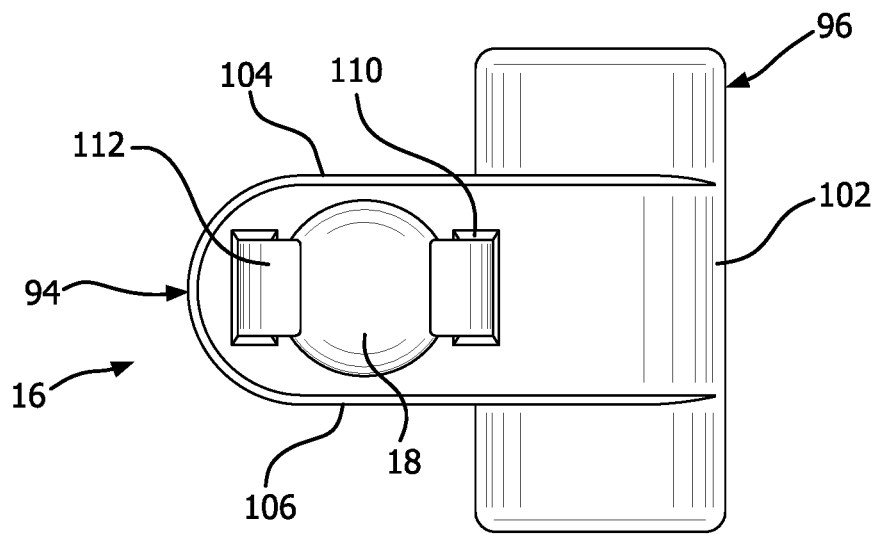
FIG. 22 is a top plan view of the keeper, protrusions, and bolt of FIG. 21.
Figure 23:
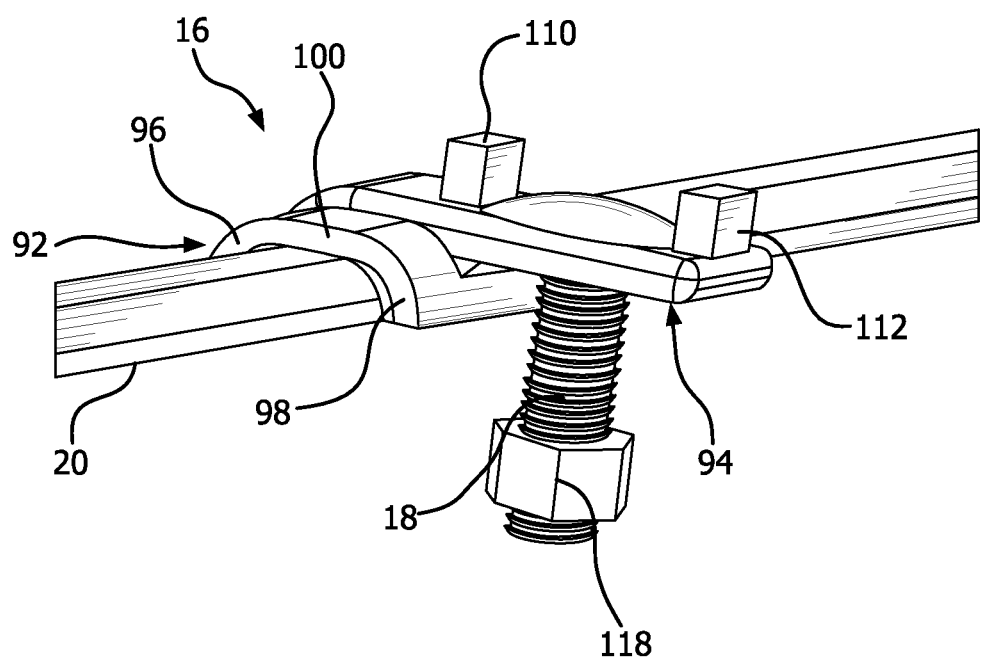
FIG. 23 is a perspective view showing the keeper, bolt and a ribbon cable of FIG. 1.

The attachment arm 94 extends substantially orthogonal to the clamping arm 92. The attachment arm 94 may have a nose 102 which is rounded to blend into the curvature of the first leg 96 of the clamping arm 92. A first side 104 and a second side 106 of the attachment arm 94 extend along and outwardly from the top of the clamping arm 92. The first and second sides 104, 106 may have curved top and bottom edges to provide a smooth transition which increases aerodynamics and reduces wind-loading on the base 10 and the cable 20. The attachment arm 94 has an opening 108 for receiving a mechanical fastener, such as the bolt 18. In an exemplary embodiment, the opening 108 is square, though various shapes and sizes may be used. A first protrusion 110 and a second protrusion 112 are located proximate opposite sides of the opening 108. The first and second protrusions 110, 112 extend so that they may be selectively peened or bent over the top of the bolt 18 after it has been positioned in the opening 108 and connected to the base 10 as best shown in FIGS. 21 and 22 to substantially rigidly couple the bolt 18 to the keeper 16.

Operation

In operation, the keeper 16 may be coupled to the base 10 by placing the bolt 18, such as a threaded carriage bolt, through the opening 108 and into the slot 74. A washer 114 and a spring or split-lock washer 116 may then be placed onto the bottom of the bolt 18 and a nut 118 threadably attached thereto. Utilizing the washer and the spring or split-lock washer 116 assists in keeping the nut from loosening and retains the keeper 16 in a maximum allowable compression position.

The keeper 16 should initially be loosely attached to the base 10 so that it can rotate relative to the base 10 about the bolt 18 and move in the slot 74 as shown in FIG. 4. Mounting hardware such as a bolt-hook 11 may be placed in a structure, such as a utility pole (not shown). The eyelet 14 may be extended through the end of the bolt-hook 11 to suspend the base 10 from the structure. A cable 20 may then be placed into the base 10 so that the cable 20 rests in the central channel 28. It should be noted that the initial placement of the hook 11, the base 10, and the cable 20 need not be performed in any particular order. The keeper 16 may then be rotated and placed so that the first leg 96 is received in the first recess 44 and the second leg 98 is received in the second recess 76. In this way, the clamping arm 92 of the keeper 16 is positioned to retain a cable 20 in the base 10 without damaging the cable. The nut 118 may then be tightened on the bolt and the first and second protrusions 110, 112 may be peened over the head of the bolt 18 so that the keeper 16 is held in place and the bolt 18 is prevented from loosening. The base 10 may also be connected to various other mounting hardware such as a straight bolt or shackle.

In various exemplary embodiments, the keeper 16 is attached to the base 10 prior to placement in the field, for example in a factory. The bolt 18 is placed through the opening 108 and into the slot 74. A washer 114 and a spring or split-lock washer 116 may then be placed onto the bottom of the bolt 18 and a nut 118 threadably attached thereto. The bottom threads of the bolt 18 may then be peened so that the nut 118 cannot be removed from the bolt 18, preventing the keeper 16 from being separated from the base. The first and second protrusion 110, 112 may also be peened prior to installation, for example at the factory. In this way, the keeper 16 may be permanently attached to the base 10 but still be capable of rotation relative to the base 10 allowing installation of the cable 20.

Various exemplary embodiments may also utilize an insert (not shown) to assist in maintaining and protecting the cable 20 in the base 10. The insert may be made from a material, such as an elastomeric material, that provides cushioning and dampening to the cable 20 during movement of the cable 20 or the base 10. The insert may have an outer diameter or shape which corresponds to or compliments the central channel 28, first and second grooves 86, 88, and/or the first and second ends 22, 24. The base 10 may also include additional stops, walls, recesses, or other structure to retain the insert in a specific position. The insert may also be retained by the keeper 16.

Figure 24:
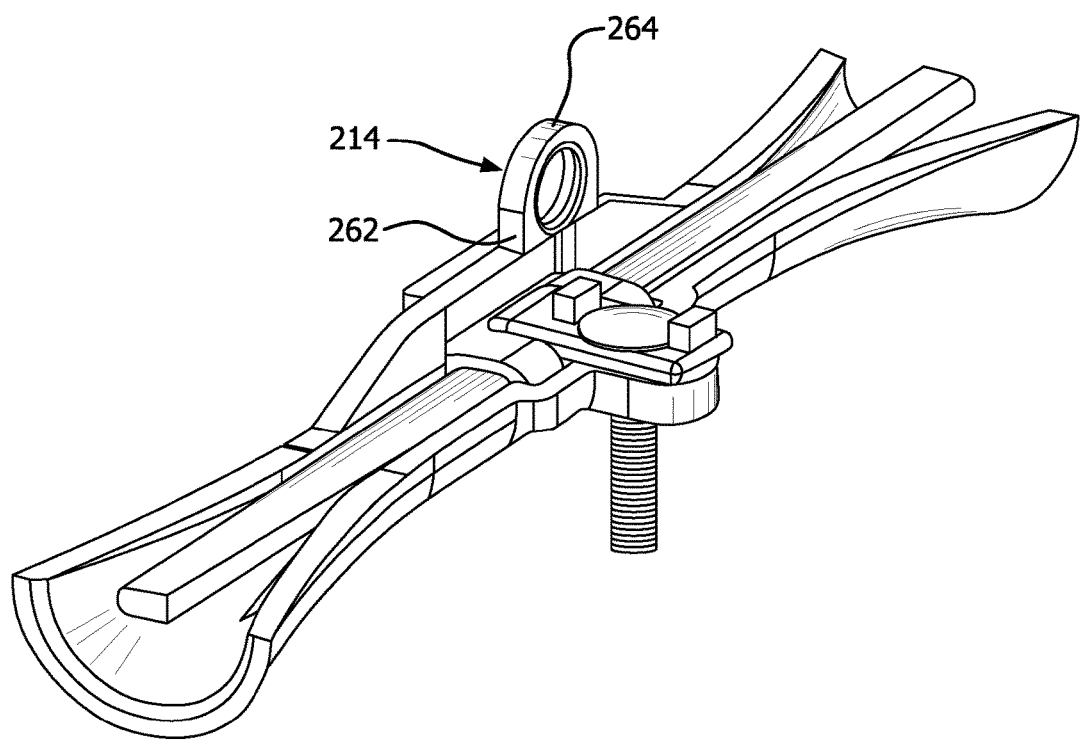
FIG. 24 is a perspective view of an alternative embodiment of the cable clamp with a modified eyelet.

Embodiment of FIG. 24

FIG. 24 shows an alternative exemplary embodiment having substantially the same structure as previous embodiments except that the eyelet 214 has a base portion 262 and a rounded top 264. The base portion 262 is wider than the rounded top 264. This type of eyelet 214 may be used with any of the exemplary embodiments described herein, and in association with various mechanical fasteners for connecting the eyelet 214 to a structure.

Figure 25:
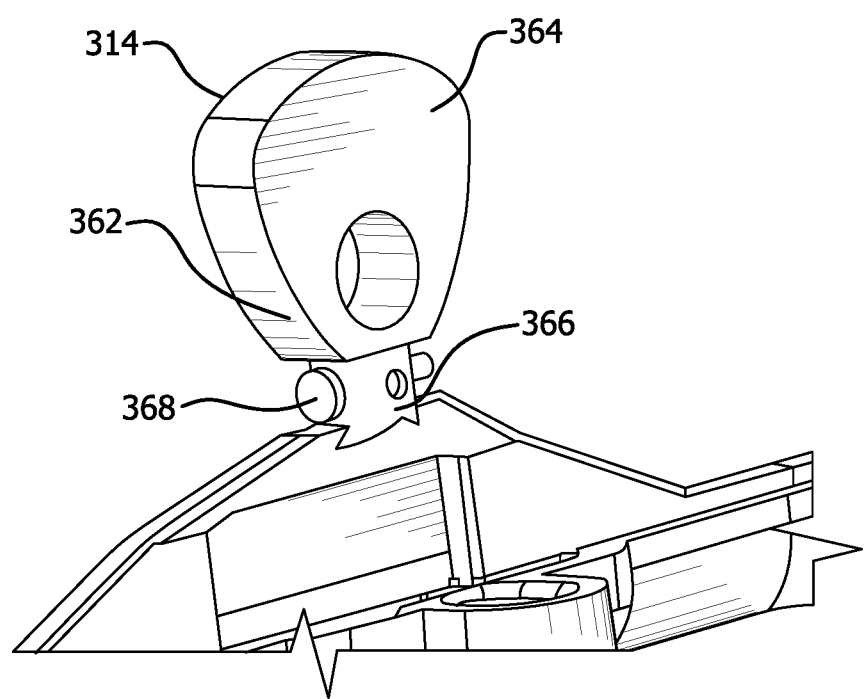
FIG. 25 is an enlarged, perspective view of an additional alternative embodiment of an eyelet on the clamp.

Embodiment of FIG. 25

FIG. 25 shows an alternative exemplary embodiment having an eyelet 314 having a narrow base portion 362 and a wide top portion 364 similar to eyelet 14 shown in FIGS. 1-23. The eyelet 314 is pivotally coupled to a suspension arm 312 by a rotating joint 366. A pin 368 may be inserted through one or more openings to maintain the eyelet 314 in a specific position. This type of eyelet 314 may be used with any of the exemplary embodiments described herein, and in association with various mechanical fasteners for connecting the eyelet 314 to a structure.

The foregoing detailed description of the certain exemplary embodiments has been provided for the purpose of explaining the principles of the invention and its practical application, thereby enabling others skilled in the art to understand the invention for various embodiments and with various modifications as are suited to the particular use contemplated. This description is not necessarily intended to be exhaustive or to limit the invention to the precise embodiments disclosed. Any of the embodiments and/or elements disclosed herein may be combined with one another to form various additional embodiments not specifically disclosed. Accordingly, additional embodiments are possible and are intended to be encompassed within this specification and the scope of the appended claims. The specification describes specific examples to accomplish a more general goal that may be accomplished in another way.

Only those claims which use the words "means for" are to be interpreted under 35 U.S.C. 112, sixth paragraph.

What is claimed:

1. A cable clamp comprising:
   a base having a center channel, a first recess, and a second recess;
   a keeper adapted to be coupled to said base, the keeper having an attachment arm and a clamping arm, the attachment arm including an opening for receiving a mechanical fastener for coupling the keeper to the base, and the clamping arm including a first leg and a second leg, said first leg received in said first recess and said second leg received in said second recess.

2. The cable clamp of claim 1, wherein said keeper has a semi-obround cross-section.

3. The cable clamp of claim 1, wherein said base comprises a suspension arm and said first recess is positioned in said suspension arm.

4. The cable clamp of claim 1, wherein said first and second recesses are elevated from said center channel.

5. The cable clamp of claim 1, wherein said keeper is spaced from said center channel when coupled to said base to define an opening to secure a ribbon cable.

6. The cable clamp of claim 1, wherein said said base includes a slot receiving said mechanical fastener.

7. The cable clamp of claim 1, wherein said keeper further comprises a central portion extending between said first leg and said second leg and said attachment arm extends substantially orthogonal to said central portion.

8. The cable clamp of claim 7, wherein said attachment arm comprises a first protrusion proximate said opening, and a second protrusion proximate said opening, wherein said first and second protrusions are peened to retain a mechanical fastener in said opening.

9. The cable clamp of claim 8, further comprising a tab extending from said base having a slot alignable with said opening in said keeper attachment arm.

10. A cable clamp comprising:
    a base having a first end, a second end, a center channel, a suspension arm, a first recess positioned in said suspension arm, and a second recess positioned opposite said first recess, the first recess including a first bottom surface and the second recess including a second bottom surface;
    a keeper coupled to said base, said keeper having a clamping arm including an arcuate first leg, an arcuate second leg, and a central portion extending between said first leg and said second leg, wherein said first leg engages said first bottom surface and said second leg engages said second bottom surface to limit movement of the keeper with respect to the center channel to prevent the keeper from over-compressing a cable positioned in said base.

11. The cable clamp of claim 10, wherein said suspension arm comprises a first wall and a second wall angled relative to the first wall.

12. The cable clamp of claim 10, wherein said keeper further comprises an attachment arm extending substantially orthogonal to said central portion having an opening for receiving a mechanical fastener.

13. The cable clamp of claim 12, further comprising a tab extending from said base having a slot alignable with said opening in said keeper attachment arm.

14. The cable clamp of claim 13, wherein the tab includes a rounded outer edge connected to a rectangular foot.

15. The cable clamp of claim 10, wherein said first and second recesses are elevated from said center channel.

16. The cable clamp of claim 10, wherein said keeper is spaced from said center channel when coupled to said base to define an opening to secure a ribbon cable.

17. The cable clamp of claim 10, wherein said keeper is removable from said base.

18. The cable clamp of claim 10, wherein said second bottom surface is planar to the said first bottom surface.

19. The cable clamp of claim 1, wherein said first recess has a first bottom surface and said second recess has a second bottom surface planar to the first bottom surface.

* * * * *